Aug. 20, 1968   J. E. DORNFELD   3,398,338
MICA DISC CAPACITOR
Filed July 10, 1967
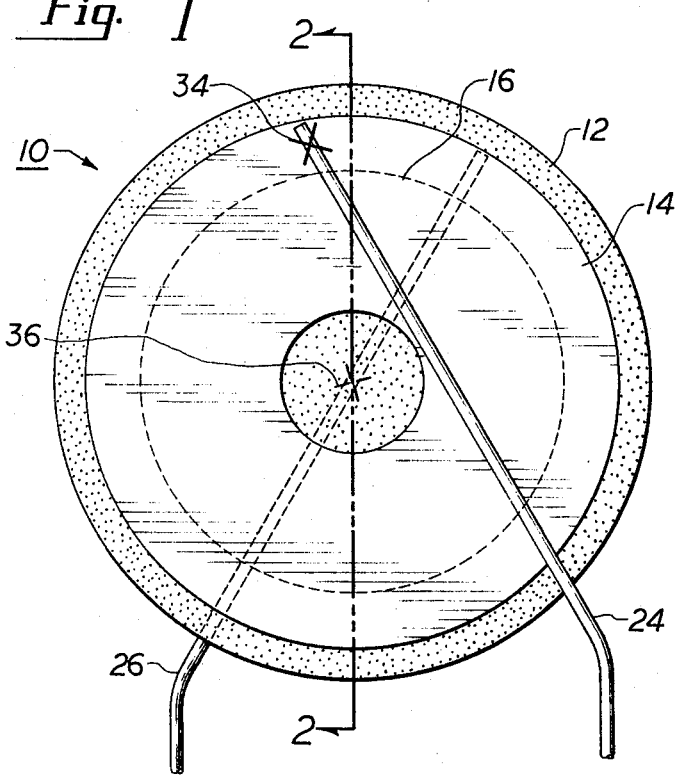
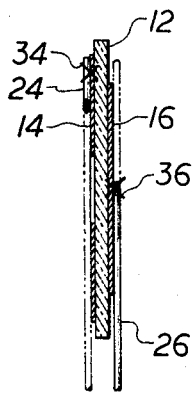
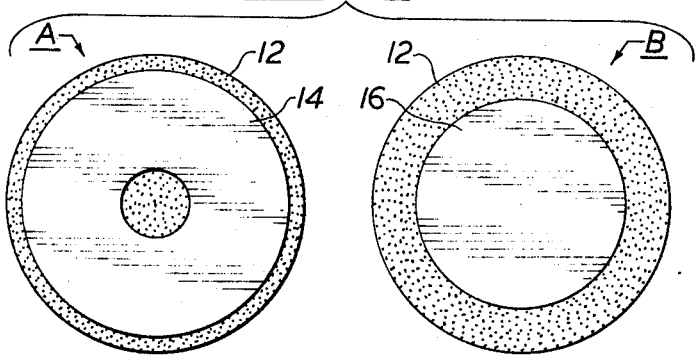

United States Patent Office 3,398,338
Patented Aug. 20, 1968

3,398,338
MICA DISC CAPACITOR
John E. Dornfeld, 11563 N. Spring Ave. 65W,
Mequon, Wis. 53092
Continuation-in-part of application Ser. No. 575,742,
Aug. 29, 1966. This application July 10, 1967, Ser.
No. 652,284
5 Claims. (Cl. 317—258)

ABSTRACT OF THE DISCLOSURE

Leads are attached to electrodes on opposite surfaces of a mica disc in areas of the electrodes that are not in capacitive overlap. The electrode on one side of the mica disc is a large diameter annulus, and the opposite electrode is a smaller diameter plate of greater area than the opening in the annular electrode and located opposite the opening. A lead is attached to the annular electrode in an area beyond the capacitive overlap with the smaller electrode, and a lead is attached to the smaller electrode in an area opposite the opening in the annular electrode.

---

This application is a continuation-in-part of Ser. No. 575,742, filed Aug. 29, 1966, and issued Dec. 26, 1967, as U.S. 3,360,701.

The present invention relates to mica disc capacitors, and more particularly to lead attachments to single layer mica disc capacitors.

Background of the invention

Parent application Ser. No. 575,742 (now U.S. 3,360,701) discloses and claims a mica capacitor in which a single mica layer is provided with electrodes disposed on opposite surfaces of the mica in capacitive overlap. Tab portions extend from the electrodes at a common end of the capacitor, and the tabs are located in non-overlapping relationship outside the capacitive area of the electrodes proper. Leads are attached to the extended tab portions of the electrodes and extend from the capacitor across the respective electrodes. This construction provides ohmic electrical contacts to the electrodes in areas that are not in capacitive overlap, so that any delamination of the mica that is caused by the attachment of the leads does not affect the capacitance of the capacitor.

Disc-type capacitors are well known to the ceramic capacitor art and offer production advantages by virtue of elimination of the orientation that is required by other configurations, including the aforementioned construction of U.S. 3,360,701. The elimination of orientation considerations in the manufacture of disc capacitors permits mass handling of the capacitors. The stable high dielectric constant and high Q of mica, and the ability of mica to be cleaved to a thinness not attainable by ceramic techniques, make mica a highly desirable capacitor dielectric for single layer capacitors, and for multiple stacking of such single layer capacitors.

Summary of the invention

An object of this invention is the provision of a single layer disc-type mica capacitor.

Another object of this invention is the provision of a disc-type mica capacitor having leads attached to the electrode surfaces in ohmic contact thereto without causing delamination of the mica dielectric.

In accordance with this invention leads are attached directly to electrodes on opposite surfaces of a mica disc by making attachments to areas of the electrodes that are not in capacitive overlap with one another.

Brief description of the drawing

FIGURE 1 is a plan view of a mica disc capacitor in accordance with this invention.

FIGURE 2 is a cross-section of the mica disc capacitor of FIGURE 1 taken along the line 2—2.

FIGURES 3a and 3b are front and back plan views respectively of mica discs of this invention having front and back electrodes applied thereto.

Detailed description of the invention

In general the capacitor of this invention includes a mica disc dielectric having conductive metal electrodes on opposite surfaces of the mica. Each electrode has a conductive lead attached thereto by suitable means to an area of the electrode that is not in capacitive overlap with any area of the electrode on the opposite face of the disc. In a preferred embodiment the conductive leads are wire leads which extend diagonally across the face of the electrode from the point of attachment, and then extend from the mica disc in spaced parallel arrangement.

In one embodiment of this invention lead attachment is made to areas of the electrodes that do not overlie one another by virtue of specific electrode configurations. The electrode on one side of the mica disc is in the shape of an annulus or torus having a large outer diameter which substantially fills the face of the mica disc, and a small inner diameter which leaves a central opening in the electrode that is substantially centrally located on the mica disc. The electrode on the opposite side of the mica disc is in the shape of a plate having a small diameter than the outer diameter of the annulus and a greater diameter than the central opening in the annulus. The plate electrode is located on the disc so as to completely cover the surface of the disc that is opposite the central opening in the annular electrode on the other side of the disc. A lead is attached to the annular electrode in an area of the annular electrode that is outside the capacitive overlap with the plate electrode. A lead is attached to the plate electrode in an area of the plate electrode that is opposite the central opening in the annular electrode.

The drawing shows a mica capacitor 10 constructed in accordance with the present invention, and prior to the application of any protective covering or encapsulation material. Disc-type mica dielectric 12 is provided with electrodes on opposite faces thereof positioned to provide substantial areas of the two electrodes that are in capacitive overlap with one another.

Mica disc 12 has an electrode 14 on one face thereof and an electrode 16 on the opposite face. Electrodes 14 and 16 are provided by any suitable means known to the mica capacitor art, e.g. screening, spray painting. It is preferred to employ the process of silk screening of conventional silver electrode compositions for the deposition of electrodes 14 and 16.

Electrode 14 is in the shape of an annulus having a larger outer diameter that substantially fills one side of the disc. The central opening in the annulus is of relatively small diameter so as to leave uncovered only a small area of the base of the disc. One of the features of this invention is that it is not absolutely necessary that electrode 14 be accurately centered on the face of disc 12 because the transparency of mica in the thicknesses employed permits the extent of coverage to be readily ascertainable by observation of either side of the mica disc.

Electrode 16 is applied to the opposite surface of disc 12 in the form of a plate. The diameter of plate electrode 16 is less than the outer diameter of annular electrode 14. However, it is important that the diameter of plate electrode 16 is substantially greater than the diameter of the central opening in annular electrode 14. It is also important that plate electrode 16 be positioned on disc 12 so as to completely cover the surface of the disc that is opposite the central opening in annular electrode 14. Again, the transparency of mica in the thicknesses employed in this invention permits considerable latitude in the placement of plate electrode 16 on disc 12. Annular electrode 14 and plate electrode 16 are of such dimensions and are so positioned on disc 12 that a considerable capacitive overlap therebetween is provided.

Lead-wire 24 is attached to annular electrode 14 in an area of electrode 14 that is beyond the capacitive overlap with plate electrode 16. The attachment of lead-wire 24 to annular electrode 14 is shown in the preferred embodiment in the drawing at 34 and may be accomplished by suitable attachment techniques known to the thin film capacitor arts, e.g., soldering or welding. Lead-wire 26 is attached to plate electrode 16 as shown at 36 which is located on plate 16 in the area of plate 16 which overlies the central opening in annular electrode 14. Again, attachment of 36 may be made by the same conventional practices that are employed for attachment 34. A particularly advantageous means for obtaining sound ohmic contacts at attachments 34 and 36 has been found to be the application of a solder cream mixture of tin-lead solder containing silver and flux to the wires or electrodes in the desired areas and then subjecting the units to heat to cause the solder to flow and bond.

The disc shape of the mica capacitor of this invention eliminates any need for edge orientation of the mica substrate and therefore offers manufacturing capabilities and economies not attainable with the configurations shown in S.N. 575,742. The disc construction of this invention permits the utilization of ceramic capacitor manufacturing techniques, such as described and claimed in U.S. Letters Patent 3,073,007, issued Jan. 15, 1963, to H. W. Rubinstein and S. B. Williams.

Lead-wires 24 and 26 are shown in the preferred embodiment of the drawing as having the familiar crossed hockey stick configuration that has gained widespread use in the ceramic capacitor art. The leads may be secured in multiple groupings to a suitable carrier, such as shown in the aforementioned U.S. 3,073,007. The crossed leads 24 and 26 may be pretensioned toward one another so as to retain disc 12 in position for subsequent soldering and encapsulating steps in the manufacturing process. The crossed lead configuration also serves to provide increased contact and support between the electrodes and their respective lead-wire. However, the lead-wires may be of any configuration suitable to the end use of the capacitor, e.g., straight leads or flat foil tab-stock are practical alternatives.

Placement of attachments 34 and 36 in areas of the electrodes that are not in capacitive overlap insures that any delamination that might be occasioned by making the attachment will not cause a delamination of the mica between the active areas of the electrodes; hence will not produce a change in capacitance.

Automatic screening equipment is utilized to produce electrodes 14 and 16 on opposite sides of disc 12 with a high degree of control over the area of capacitive overlap between the electrodes; hence a tight control over the capacitance of the unit. The construction of the preferred embodiment of this invention offers a high degree of control over capacitance by permitting easy variation in the size of the central opening in the annular electrode. Moreover, the capacitance of the capacitor of this invention may be adjusted downward by using conventional abrasive techniques to remove electrode material from one or both sides of disc 12.

Capacitor 10 of this invention is provided with any suitable covering or encapsulation known to the mica and ceramic capacitor arts. The protective covering may be provided by dipping the capacitors in conventional cover-coating material, or may be provided by molding. In general, the epoxy compositions that have widespread use in the ceramic capacitor art are not employed in the preferred embodiment of this invention, because of differences in shrinkage that are apt to cause thermal shock which could cleave the mica substrate. The preferred encapsulation for the capacitor of this invention is obtained by dipping the units in phenolic coating material.

Various modifications may be made in the instant invention without departing from the spirit and scope thereof as defined in the appended claims.

What is claimed is:
1. An electrical capacitor comprising a mica disc having a plate electrode on one face thereof, an annular electrode on the opposite face of said disc in substantial capacitive overlap with said plate electrode, a lead attached to an area of said plate electrode that overlies the central opening in said annular electrode, a lead attached to an area of said annular electrode beyond the capacitive overlap with said plate electrode, whereby delamination of the mica disc in the capacitive overlap area is avoided.

2. The capacitor of claim 1 wherein said annular electrode has an outer diameter that substantially fills a surface of said disc, and said plate electrode has a diameter less than the outer diameter of said annular electrode and substantially greater than the inner diameter of said annular electrode.

3. The capacitor of claim 2 wherein said plate electrode covers the entire area on the surface of said disc opposite the central opening in said annular electrode.

4. The capacitor of claim 2 wherein attachment of the lead to said annular electrode is to an outer area located between the differences between the outer diameter of said annular electrode and the diameter of said plate electrode.

5. The capacitor of claim 1 wherein said leads extend diagonally across the electrode surfaces and extend from said disc in substantially parallel alignment.

References Cited
UNITED STATES PATENTS

| | | | |
|---|---|---|---|
| 3,241,014 | 3/1966 | Rubinstein | 317—242 |
| 2,608,601 | 8/1952 | Boardman | 317—261 |

OTHER REFERENCES

German printed application No. 1,203,391, October 1965 (Jahre).

LARAMIE E. ASKIN, *Primary Examiner.*

E. GOLDBERG, *Assistant Examiner.*

UNITED STATES PATENT OFFICE
CERTIFICATE OF CORRECTION

Patent No. 3,398,338                            August 20, 1968

John E. Dornfeld

It is certified that error appears in the above identified patent and that said Letters Patent are hereby corrected as shown below:

In the heading to the printed specification, lines 3 and 4 "John E. Dornfeld, 11563 N. Spring Ave. 65W, Mequon, Wis. 53092" should read -- John E. Dornfeld, Mequon, Wis., assignor to Sprague Electric Company, North Adams, Mass., a corporation of Massachusetts --.

Signed and sealed this 13th day of January 1970.

(SEAL)
Attest:

Edward M. Fletcher, Jr.                       WILLIAM E. SCHUYLER, JR
Attesting Officer                                         Commissioner of Patents